United States Patent
Caze et al.

(10) Patent No.: US 6,991,720 B2
(45) Date of Patent: Jan. 31, 2006

(54) STRUCTURED CATALYSTS INCORPORATING THICK WASHCOATS AND METHOD

(75) Inventors: Philippe Caze, Fontainebleau (FR); Didier Letourneur, Lyons (FR); Paulo Marques, Fontainebleau (FR); Christophe Remy, Thomery (FR); Pierre Woehl, Cesson (FR)

(73) Assignee: Corning Incorporated, Corning, NY (US)

( * ) Notice: Subject to any disclaimer, the term of this patent is extended or adjusted under 35 U.S.C. 154(b) by 265 days.

(21) Appl. No.: 10/376,145

(22) Filed: Feb. 28, 2003

(65) Prior Publication Data

US 2003/0176280 A1 Sep. 18, 2003

(51) Int. Cl.
*C10G 45/04* (2006.01)
*C10G 45/60* (2006.01)

(52) U.S. Cl. .................. 208/209; 208/213; 208/245 R; 208/262.1

(58) Field of Classification Search .................. 208/209, 208/213, 254 R, 262.1
See application file for complete search history.

(56) References Cited

U.S. PATENT DOCUMENTS

| | | |
|---|---|---|
| 3,928,239 A | 12/1975 | Yonehara et al. |
| 4,367,162 A | 1/1983 | Fujitani et al. |
| 4,429,718 A | 2/1984 | Mercier |
| 4,460,699 A | 7/1984 | Convers et al. |
| 4,467,050 A | 8/1984 | Patel et al. |
| 4,529,718 A | 7/1985 | Dupin |
| 4,762,567 A | 8/1988 | Retallick |
| 4,800,187 A | 1/1989 | Lachman et al. |
| 4,921,731 A | 5/1990 | Clark et al. |
| 5,116,586 A | 5/1992 | Baacke et al. |
| 5,210,062 A | 5/1993 | Narula et al. |
| 5,272,125 A | 12/1993 | Weible et al. |
| 5,407,880 A | 4/1995 | Ikeda et al. |
| 5,466,651 A | 11/1995 | Pfefferle |
| 5,585,136 A | 12/1996 | Barrow et al. |
| 5,618,772 A | 4/1997 | Suda et al. |
| 5,681,788 A | 10/1997 | Kanesaka et al. |
| 5,874,153 A | 2/1999 | Bode et al. |
| 6,001,320 A | 12/1999 | Addiego |
| 6,537,946 B1 | 3/2003 | Tanada et al. |

FOREIGN PATENT DOCUMENTS

| | | |
|---|---|---|
| DE | 100 50 748 | 9/2001 |
| EP | 0 847 803 | 6/1998 |
| EP | 1121981 A2 * | 8/2001 |
| JP | 07-124468 * | 5/1995 |
| WO | 95/23025 | 8/1995 |
| WO | 00/43337 | 7/2000 |
| WO | 01/16052 | 3/2001 |

* cited by examiner

*Primary Examiner*—Tam M. Nguyen
(74) *Attorney, Agent, or Firm*—Kees van der Sterre

(57) ABSTRACT

Structured catalysts comprising thick porous inorganic catalyst support coatings disposed on monolithic catalyst support structures, the support coatings having open interconnected porosities of controlled pore size but being characterized by improved durability, physical integrity, and adherence sufficient for use in liquid phase applications under harsh reaction conditions, and methods for making and using them, are disclosed.

9 Claims, 1 Drawing Sheet

STRUCTURED CATALYSTS INCORPORATING THICK WASHCOATS AND METHOD

BACKGROUND OF THE INVENTION

The present invention relates to structured catalysts, and more particularly to structured catalysts of honeycomb or other open cross-flow shape wherein the catalysts are supported on the interior surfaces of the structures by catalyst support or washcoating layers configured to improve catalyst effectiveness for the treatment of fluid reactant streams passing through the structure.

Inorganic honeycombs supporting catalyst coatings on the interior channel walls of the honeycombs are widely used for applications such as automobile engine exhaust emissions control. In general, the catalysts for these applications are manufactured by washcoating selected ceramic or metallic honeycomb structures with slurries comprising refractory, high-surface-area catalyst support oxides, and then depositing selected metallic catalysts on the surfaces of the support oxides. Thin washcoats of alumina supporting precious metal catalysts such as platinum, palladium and rhodium these applications are disclosed, for example, in U.S. Pat. Nos. 4,762,567 and 4,429,718.

A related coating technology, more commonly used to deposit thin and usually dense oxide coatings on substrates, is sol-gel processing. U.S. Pat. No. 5,210,062 discloses the use of oxide sols to deposit thin washcoats on honeycomb supports for automotive catalytic converters. Sol-gel coatings have also been used, for example, to protect underlying substrate materials, to improve wear resistance, and to impart desired dielectric properties. The starting materials for these processes are liquid sols, which may be defined as liquid suspensions of solid particles that are small enough to remain suspended indefinitely by Brownian motion. In the sol-gel process, these sols are converted to gels by appropriate chemical or thermal treatments during which solid or semi-solid networks of the solid particles are formed, with the liquid phases being uniformly interspersed throughout.

Gels produced in this way can exhibit viscous flow behavior permitting shaping into useable forms such as bulk shapes, fibers, coatings and the like. Oxide films can be prepared from the gels or their precursor sols by methods such as spin, dip, spray, bead, slot, curtain or brush coating, with subsequent heating to remove the liquids and convert the solids to thin and/or dense oxide coatings of a variety of predetermined compositions and structures.

One common sol-gel approach for producing protective oxide coatings, disclosed for example in U.S. Pat. Nos. 4,921,731 and 5,585,136 and in published PCT application No. WO 01/16052, is to dissolve organometallic precursor compounds of the desired oxides in a suitable solvent and to hydrolyze the organometallics to form the sol. This sol is subsequently converted by chemical treatment or heating to an organic-inorganic gel comprising the solvent, oxide particles, and organo-metallic polymers or clusters. Coatings of these gels can then be further heated to convert them to oxide coatings. The tendency of such sol-gel oxide coatings to crack during heating is reduced through the use of particulate oxide fillers of appropriate composition. Where increased coating density is required, a treatment using phosphate components is used.

The use of sols as oxide powder binders for thin oxide catalyst support coatings has also been proposed. U.S. Pat. No. 3,928,239, for example, employs a permanent binder of an inorganic acid alumina sol in an alumina washcoat for an automotive or stationary exhaust gas oxidation catalyst. Further, published PCT application No. WO 95/23025, discloses sol-based oxide underlayers for bonding conventional metal-oxide catalyst coatings to metallic catalyst supports.

An important goal of much of the washcoating technology developed for the support of precious metal automobile and other exhaust emissions control catalysts has been the protection of the oxidation activity of the largely surface-concentrated catalyst deposits at high operating temperatures and high gas flow rates. Coating thicknesses are minimized to reduce system back-pressures; thicker coatings confer no advantage and are avoided for this reason. Thus adherent washcoats of relatively high surface area and refractoriness, but relatively low thickness and porosity, have been used. Unfortunately, such catalysts and washcoats are not very effective for promoting other types of reactions, including many reactions requiring longer reactant diffusion paths or involving mixed gas/liquid reaction streams.

SUMMARY OF THE INVENTION

In accordance with the invention a structured catalyst incorporating a thick washcoat and method of making it are provided that offer significantly improved catalyst effectiveness for slow as well as fast reactions, e.g., reactions that may involve liquid phase processing and/or that require relatively long catalyst contact times. The improved catalytic effectiveness of the invention is achieved through the use of structured washcoats of substantial thickness and controlled porosity in combination with such monoliths, with the active catalyst is purposefully distributed within the structured washcoat to achieve optimal effectiveness for the particular reactant stream and/or reactant combination being treated.

Characteristic features of these structured washcoats, in addition to their controlled thickness and pore morphology, are full physical integrity (substantial freedom from cracks), and high resistance to erosion even under reactor conditions involving rapid or turbulent flow conditions, whether of single phase (gas or liquid) or two-phase (gas and liquid) composition. These features enable the use of structured metal and ceramic supports for the washcoats and catalysts that would otherwise be unsuitable for reasons such as inadequate porosity or surface area, chemical incompatibility with the catalyst or reactant stream, and/or poor chemical or physical durability. Also, the washcoats may themselves be formed of combinations of support materials that are not economically capable of direct shaping into honeycomb structured catalyst configurations, or that offer combinations of chemical and physical properties not attainable in conventional metal or ceramic systems.

In a first aspect, then, the invention includes a structured catalyst comprising a thick porous inorganic catalyst support or washcoat layer disposed on at least the interior surfaces of an inorganic monolithic support structure. For the purpose of the present description monolithic support structures and the structured catalysts made therefrom are both characterized as integral structures comprising internal void spaces (channels, cavities or the like) bounded by internal surfaces and within which a reactant stream entering structured catalyst for treatment comes into contact with catalytically active species in the washcoat layer disposed on the internal surfaces. The washcoat or catalyst support layer, which is generally of oxide composition, will have both a predetermined porosity and a minimum layer thickness. The monolithic support structure is typically of either metallic or ceramic composition, the latter being inclusive of carbide, nitride, boride and other non-traditional ceramic formulations as well as conventional oxide ceramic materials.

In the case of a honeycomb support structure the catalyst support layer will be disposed on the channel walls as a thick porous inorganic catalyst support layer. That layer will typically (i) comprise at least some coating areas or sections having a total thickness in excess of 300 μm, (ii) provide an open and interconnected porosity of at least 5%, more preferably at least 30%, and (iii) be characterized by a mean pore size in the range from $0.2-10^4$ nanometers. Disposed on or within the pore structure of this catalyst support layer will be a metal, metal oxide or other catalytically active species having activity and selectivity for the particular reaction for which the structured catalyst is to be used.

In a second aspect, the invention includes a method for making a structured catalyst of monolithic configuration as above described. In accordance with that method an inorganic support structure is first provided, that structure incorporating a plurality of internal voids or channels comprising interior catalyst support surfaces, this internal structure being open to the exterior of the structure so that a reactant stream to be processed can be brought into contact with the surfaces. A particularly suitable support structure is an inorganic honeycomb structure comprising a plurality of parallel through-channels through which the reactant stream may flow. To at least the interior channel walls or surfaces of the support structure thus provided is applied a wash-coating slurry comprising a powdered oxide catalyst support material.

The slurry includes a liquid phase that constitutes or contains a precursor for a permanent inorganic binder for the oxide catalyst support material. The inorganic binder, typically a metal oxide binder, is selected for its effectiveness in forming a thick washcoat of the required internal pore structure. The composition of the binder may be the same as or different from the composition of the catalyst support material, and its precursor will generally be an organometallic or inorganic compound of the metal that is soluble or highly dispersible in the liquid phase of the slurry.

Following application of the wash-coating slurry to the interior channel walls of the support structure to form a first slurry coating layer, the structure and its included coating layer are next heated to a temperature at least sufficient to remove the liquid phase from the slurry to form a first deposited support layer. Further heating to cure or partially sinter this first deposited layer is preferably undertaken immediately after removal of the liquid, but may alternatively be deferred until after additional deposited layers are provided. Thus, following removal of the liquid phase from the first deposited layer, the steps of applying wash-coating slurry and heating to remove the liquid phase can be repeated to form one or more additional deposited layers on the first deposited layer, with this process being repeated until the combination of the first and any additional deposited layer(s) reaches a combined thickness of at least about 300 μm. Final heating to cure or partially sinter the last and any underlying uncured deposited layers can then be carried out.

The step of providing a catalytically active species on or within at least one, but more typically all, of the deposited layers can be carried out either during layer deposition, or after all of the layers have been deposited, and either before or after layer curing has been carried out. This flexibility allows for the development of structured catalyst layers not easily obtainable by conventional washcoating methods.

More specifically, the invention includes a method of making a structured catalyst such as above described wherein close control over the composition or concentration of the catalyst within the structure of the washcoating can be provided. As above described, the steps of that method include the basic steps of providing a wash-coating slurry that contains the powdered oxide catalyst support material dispersed in a liquid phase incorporating the inorganic binder precursor; and then depositing the slurry on the support to form first and succeeding slurry coating layers, with heating as appropriate to remove liquid phases from the layers, until a washcoating of the required thickness is provided. However, in accordance with this aspect of the invention the distribution of catalyst within the washcoat is controlled by providing catalytically active material on or within at least some of the coating layers as they are deposited. This permits the catalytic species in at least some of the layers to differ in composition and/or in concentration from that provided in adjacent layers. Alternatively, it permits precise control over the concentration of a single catalytically active species in each layer, thus insuring a high degree of catalyst concentration uniformity across the entire layered structure. This process thus offers the option of a completely homogenous distribution of catalyst throughout the entire thickness of the thick washcoat, or alternatively a layered washcoat wherein the layers may not only contain different catalytic species, but may also differ from adjacent layers as to thickness, porosity, or both. The steps that can optionally be followed to vary the composition, pore morphology, or other properties of the catalyst support layer for the purpose of adapting the structured catalyst to specific applications are several. For example, catalysts or other additives can be included in the slurry composition, or instead deposited on the powdered oxide catalyst support added to the slurry. The latter procedure is particularly effective to insure a wide distribution of catalyst throughout the thickness of the catalyst support layer after curing.

Also useful as optional slurry constituents are pore-forming additives that can be used to modify the pore structure of the layers through subsequent thermal or chemical treatment thereof. And, constituents that can promote gelling of the deposited layers prior to drying can be included in the slurries as a means to increase deposited layer thickness, modify the final coating microstructure, or control the geometrical shape of the deposited layers.

In yet a third aspect the invention comprises an improvement in the process for catalytically treating a liquid or gas-liquid feedstream with a structured catalyst. Structured catalysts of the kind conventionally used for gas phase reactions, comprising inorganic catalyst support structures wherein the catalysts are disposed on relatively thin oxide catalyst support coatings have been proposed for such treatments, but are not well adapted for such use. In general, the volumes of catalyst are small, catalyst accessibility is limited, and the coatings are insufficiently durable to tolerate contact with flowing liquids.

In accordance with the invention the oxide catalyst support coating employed is a thick, porous, strongly adherent oxide washcoat incorporating at least some coating sections exhibiting a total thickness in excess of 300 μm and having a high volume of open, interconnected porosity. That porosity is generally characterized by a mean pore size in the range of about $0.2-10^4$ nanometers and a pore volume making up at least 5% by volume, preferably at least 30% by volume of the washcoat.

DESCRIPTION OF THE DRAWINGS

The invention may be further understood by reference to the drawings, wherein.

DETAILED DESCRIPTION

Figure 1:
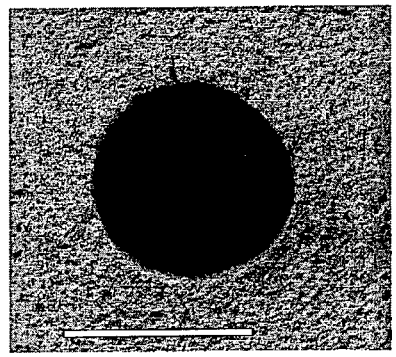
FIG. 1 shows a cross-section of a washcoated honeycomb catalyst provided in accordance with the invention.

An important aspect of the invention is the finding that conventional thin washcoating layers, e.g., generally below 300 micrometers in thickness, will not perform adequately in many chemical reactions involving the treatment of liquid-containing feed streams at reasonable liquid flow rates. This can be because the flowing liquids tend to separate the coatings from the supports, or because for reactions with a weak limitation by mass transfer a thin layer of catalyst results in unacceptable process yields, or both.

Providing substantial areas of strongly adhering porous coating material at thicknesses of 300 micrometers or more in accordance with the invention can significantly improve process yields. In fact, even higher thicknesses, e.g. coating layers averaging above 300 micrometers, or even above 500 micrometers or 750 micrometers in thickness will be required for some two- and three-phase reactions involving the treatment of flowing liquid or gas-liquid feedstreams in order that commercially acceptable reaction rates can be realized.

An important advantage of the use of thick washcoats in accordance with the invention is the ability to tailor the texture of the washcoat to develop a specific pore morphology for each intended application. The porosity, and particularly the macroporosity, of the washcoat can be adjusted either by process modifications or through the use of supplemental pore formers. Of course the use of highly porous washcoats has the recognized tendency to decrease washcoat density and catalyst loading density per unit of reactor volume so that, in general, compromises providing the optimal pore morphology for each particular structured catalyst application and reactor design are necessary.

Tuning washcoat texture extends not only to the development of higher or lower washcoat densities, but also to the creation of different textures across the thickness of the deposited washcoat, e.g. through use of washcoat layering. Multiple functionalities can be provided by incorporating two or more regions of differing density, pore morphology, or catalyst concentration or composition within selected portions the washcoating layer. Many of the techniques for the production of washcoating layers permit good control over layer thickness and coating texture. Thus different textures at each point across the thickness of the coating and/or multimodal pore size distributions at selected points where required for a particular chemical processing application, are readily enabled.

Control over washcoat surface texture is of particular interest for applications such as counter-current catalytic reactions wherein liquid and gas flow rates and reactor operating ranges are limited by flooding phenomena. Although flooding can be triggered by various mechanisms, as well documented in the literature, the use of washcoats with optimized texture to impact certain of these mechanisms can be effective to retard flooding so that higher liquid and/or gas flow rates and broader reactor operating ranges can be achieved. For example, honeycomb monoliths provided with highly porous washcoats may favor more stable liquid films on the channel walls of the honeycombs, retarding the formation of liquid bridges that can induce flooding in such channels.

Washcoat porosity and morphology can also be useful to control the selection and concentration of chemical species adsorbed on the walls of structured catalysts, e.g., the thickness of the liquid film formed on the channel walls of a washcoated honeycomb. High washcoat porosity can reduce the incidence of dry spots on such channel walls as porous surfaces are more easily wetted by flowing liquids.

Mass transfer control in catalytic reactors is another area where the adjustment of washcoat pore morphology can be helpful. For example, the use of more porous washcoats can increase chemical reaction efficiency in cases where catalyst accessibility is a controlling factor in a rate limiting reaction step. Further, where the channel walls of a structured catalyst themselves feature open porosity, permitting some liquid flow between channels, the use of highly porous washcoats can aid inter-channel liquid flow that can help to equalize liquid loading among the various channels through the catalyst.

Washcoats with different textures across their thicknesses can be effective to limit the diffusion of particular reactants to particular catalysts disposed in specific locations within the washcoat layer. Such limits can be of substantial advantage for purposes such as improving the selectivity of the structured catalyst for certain reactions. Thus, for example, undesired reactions with larger molecules in a multi-component reactant feed can be retarded using reduced washcoat pore sizes to limit molecular access to underlying catalyst layers. An analogy is found in the present commercial use of bimodal catalysts for the removal of V and Ni through the hydro-demetallization of heavy oil feedstocks. However, conventional catalyst deposition methods favoring the homogeneous distribution of catalyst metals or oxides on or within homogenous supports or washcoats, including impregnation, adsorption, precipitation and direct extrusion methods, do not lend themselves to the production of these graded catalysts.

One example of a structured catalyst that can easily be implemented through the use of the thick washcoats of the invention is an "eggshell" catalyst of only limited layer thickness. These catalyst types can be used alone or in combination with buried layers of other catalysts. Also possible are shielded catalysts intended for use with solid-bearing abrasive gas or liquid feeds, wherein a reactant-permeable porous protective washcoat layer is applied over the underlying catalyzed washcoat to diminish catalyst erosion in use. Thermally engineered catalysts incorporating high-heat-capacity washcoat layers effective to limit catalyst heating and deactivation in strongly exothermic reactions can also be designed.

The process variations useful for the production of thick washcoats on structured catalysts in accordance with the invention are those effective to produce crack-free, adherent coatings with adequately interconnected porosity at high coating pore volumes. In general, the more successful procedures will involve the use of inorganic binder formulations wherein the permanent binder component of the formulation is a dissolved compound or well-dispersed solid of a particle size that is well below that of the oxide powder forming the bulk of the washcoat, and also below the intended pore size of the coating. Such components can include inorganic oxide sols as well as dispersions of solid oxides of very fine particle size.

Structured catalysts provided in accordance with the invention offer significant economic and performance advantages when used in commercial reactors employed for the processing of liquid and gas-liquid process streams. A particularly important advantage is that essentially any durable structure can be used to support the thick washcoats and catalysts, since the impacts of support structure chemistry and microstructure are essentially eliminated. Thus no special compositional or microstructural properties are required of the structure supporting the washcoat and catalyst.

The porous washcoats themselves can be provided in a wide range of thicknesses and porosities, e.g., from 300 micrometers to 3 or more millimeters in thickness, with average pore sizes ranging up to 10 micrometers and pore volumes from at least 5%, or more preferentially from at least 30%, up to 65% or even higher. Yet the coatings are sufficiently adherent and durable, particularly when oxide gel binder phases are employed, that they can offer dependable service in gas-liquid environments with small risk of washcoat damage or loss of catalyst even at relatively high gas and/or liquid velocities. Hydrotreating reactions such as hydrogenation, hydrodemetallization, and hydrodesulfurization, carried out with gas-liquid feed streams wherein hydrogen is present in the gas phase, are examples of reactions wherein thick porous washcoats of the kind herein described are particularly useful.

The composition of the particular catalytically active species that may be incorporated within the porous washcoats of the structured catalysts is not critical, but may be determined in accordance with conventional practice, i.e., in view of the particular application or process environment within which the structured catalyst is to be utilized. Conventional catalysts that can be advantageously employed in accordance with the invention include at least the precious metal catalysts of Group VIIIA of the Periodic Table of Elements, as well as the transition metals of Groups IVA, VA, VIA, VIIA and VIIIA thereof.

The invention may be further understood by reference to the following detailed examples of thick washcoats provided in accordance therewith, which, however, are intended to be illustrative rather than limiting.

EXAMPLE 1

Structured Catalyst Support with Thick Sol-Bound Washcoat

A thick durable alumina washcoat of high porosity is provided on the interior channel walls of a ceramic honeycomb monolith catalyst support of cordierite composition. The ceramic honeycomb selected for washcoating is a square-celled cordierite honeycomb having a cross-sectional cell density of about 7 cells/cm$^2$ and a channel wall thickness of about 0.6 mm.

To provide an alumina washcoating on the interior channel walls of this honeycomb, a quantity of aluminum isopropoxide (99% wt.) is first hydrolyzed by mixing with hot water and the mixture then peptized by the addition of nitric acid to achieve a pH of 4 to produce an alumina sol binder solution containing about 1 mole of alumina per liter of sol.

A quantity of a high-surface-area gamma alumina powder (surface area of about 200 m$^2$/g) is next added to this alumina sol to produce a slurry for a honeycomb washcoat. A weight addition of about 0.35 parts powdered alumina for each 1 part of alumina sol is sufficient to form an alumina slurry of a viscosity suitable for application to the selected honeycomb by dipping, either directly or with some water thinning as appropriate to insure complete coverage of internal channel surfaces.

To deposit the alumina washcoat, the cordierite honeycomb is dipped in the alumina slurry, allowed to drain, and the residual coating layer then dried and cured by heating the honeycomb and coating to a temperature of 600° C. This heating cures and strongly binds the coating layer to the honeycomb channel walls. These dipping, draining, drying and curing steps are then repeated to deposit two additional washcoating layers onto the walls of the honeycomb channels.

The product of a procedure such as described is a coated cordierite honeycomb supporting a porous alumina washcoat of substantial thickness. A representative coated channel of that honeycomb is illustrated in the photomicrograph constituting FIG. 1 of the drawing, the white bar in the micrograph corresponding to a dimension of 2 mm. The porosity of the illustrated washcoat is about 65% as determined by mercury intrusion porosimetry. FIG. 2 of the drawing is a scanning electron photomicrograph of a channel section of a similarly washcoated cordierite honeycomb wherein the white bar represents a dimension of 600 micrometers.

Figure 2:
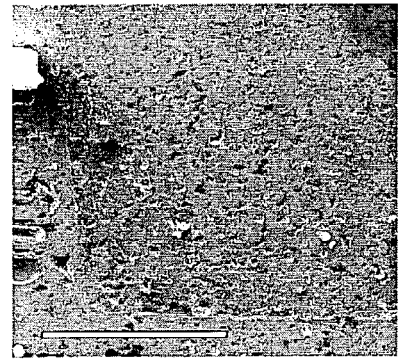
FIG. 2 is an enlarged view of a section of a thick alumina washcoat provided in accordance with the invention.

As FIG. 1 of the drawing suggests, a washcoating procedure such as described above readily produces a coating layer thickness in excess of 700 micrometers over the entire wall surface of each channel, with at least some sections of the coating layer, e.g. the corner sections shown in FIG. 1, exceeding 1500 micrometers in thickness. Yet despite this substantial thickness and high coating porosity, these coatings are well-adhered and durable, have good resistance to thermal shock, and can withstand prolonged exposure to flowing liquid, gas-liquid, and even gas-liquid-solid feed streams without chipping or spalling.

EXAMPLE 2

Pt Catalyst on Thick Alumina Washcoat

To prepare a structured platinum catalyst, a catalyst support in the form of an alumina-washcoated cordierite honeycomb produced in general accordance with the procedure described in Example 1 above is first provided. For this catalyst, a catalyst preparation is made by dissolving H$_2$PtCl$_6$ in 80 ml water to form an aqueous solution containing about 0.4% platinum by weight.

The washcoated catalyst support is catalyzed by immersion into the catalyst solution thus provided, the result being a complete platinum impregnation of the porous alumina washcoat throughout its thickness. Following the impregnation of the washcoat with the catalyst solution, the solution-treated support is dried and then heated in air to 400° C. to vaporize the water and convert the platinum compound to platinum. It is thereafter cooled and examined.

Electron microprobe examination of the catalyst-impregnated washcoat thus prepared shows a good distribution of the catalyst throughout the coating.

The thus-catalyzed washcoat retains a porosity of about 50% and an average pore size of about 10 nm. Quantitative chemical analysis indicates that the final platinum loading of the washcoat is about 0.3% by weight, calculating the platinum as the oxide. The catalyzed washcoat remains substantially free of cracks and voids, and is bonded strongly enough to the honeycomb substrate to provide good resistance to chipping and flaking under combined gas and liquid flows.

Figure 3:
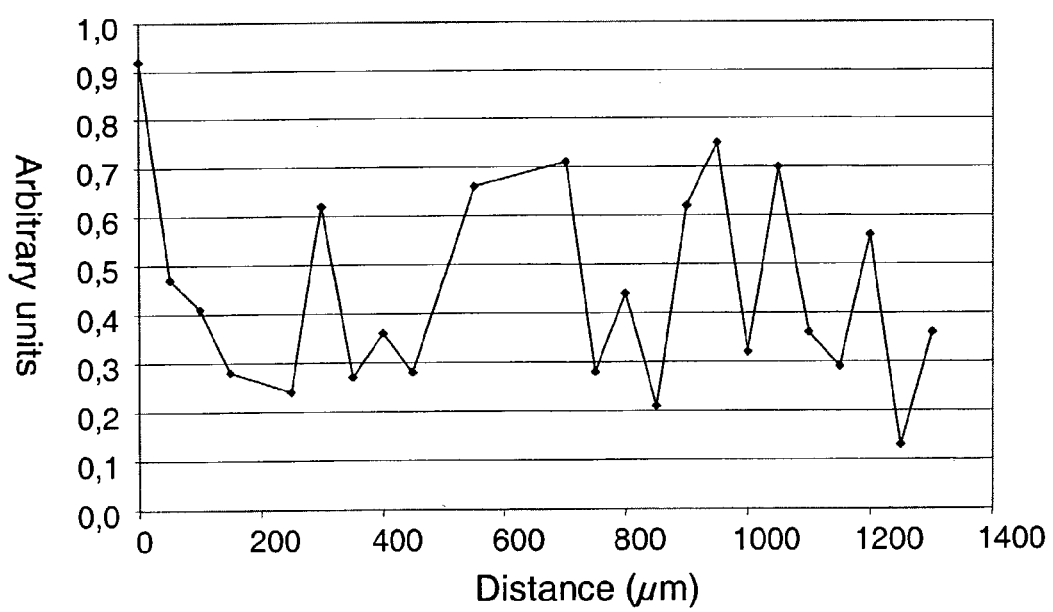
FIG. 3 is a plot of catalyst concentration through a cross-section of a thick washcoat provided in accordance with the invention.

FIG. 3 of the drawing plots platinum concentration against coating depth through a 1.3 mm-thick section of a platinum-catalyzed alumina washcoat produced substantially in accordance with the foregoing example. The platinum concentrations shown in FIG. 3 are in arbitrary units, corresponding to the relative concentration of platinum as the oxide. Platinum concentrations are shown as a function of depth into the washcoating from the washcoat surface toward the washcoat base in micrometers. As FIG. 3 reflects, good penetration of the platinum into the porous washcoat is achieved by wet impregnation as described, with no significant gradient in platinum concentration being observed as between surface and base regions of the washcoat.

EXAMPLE 3

Alumina-Supported Pt Catalyst in Thick Washcoat Support

An alternative method of making a structured catalyst with a thick washcoat involves uniformly impregnating a powdered oxide washcoat filler material with a catalyst prior to combining it with a selected sol binder solution. To provide a catalyzed alumina washcoat in accordance with this method the procedure of Example 1 is repeated, except that the gamma alumina powder introduced into the washcoating slurry is a powder that has first been catalyzed with platinum before being combined with the alumina binder sol.

A catalyzed alumina powder suitable for this purpose is prepared by treating a quantity of high-surface-area gamma alumina powder (surface area of about 200 $m^2/g$) with a $H_2PtCl_6$ catalyst solution prepared as reported in Example 3 above. The alumina powder is added to this solution with mixing, and the resulting mixture is then dried by heating in air to 400° C.

The catalyzed alumina thus prepared is added to a quantity of alumina sol as described in Example 1, and a cordierite honeycomb is then washcoated with the resulting catalyst-containing slurry as therein described. With repeated dip-coating, drying, and curing as described in that Example a final washcoat thickness of about 0.8 mm is achieved. The resulting product is a thick-washcoat structured platinum catalyst wherein a uniform, gradient-free distribution of the platinum catalyst across the entire thickness of the alumina washcoat is provided.

EXAMPLE 4

Alumina-Supported Base Metal Catalyst in Thick Washcoat Support

The gamma alumina catalyst impregnation procedure of Example 3 is repeated except that the catalyst introduced onto the alumina powder is a cobalt-molybdenum catalyst of the type useful for the hydrotreating of petroleum distillate feedstocks. An aqueous solution of cobalt nitrate and ammonium heptamolybdate is added dropwise to a quantity of high-surface-area gamma alumina powder (surface area of about 200 $m^2/g$), with mixing and the thus-treated powder is dried and then heated to 460° C. to convert the salts to the oxides.

The catalyzed alumina thus provided is next added to an alumina sol binder solution prepared as described in Example 1. The alumina addition is made in a proportion of about 0.3 parts alumina powder for each part of sol binder solution by weight, with water being added after the alumina powder addition to adjust to a suitable washcoating viscosity.

A cordierite honeycomb as described in Example 1 is then washcoated with the resulting catalyst-containing slurry by dip-coating, drying, and curing as described in that Example. These coating steps are repeated to achieve a total catalyzed washcoat thickness of about 1 mm within the channels of the honeycomb. The final product is a structured Co—Mo catalyst wherein the catalyst oxides are distributed uniformly throughout the entire thickness of the thick alumina washcoat.

EXAMPLE 5

Structured Catalyst Support Washcoat with Fine Oxide Binder

As an alternative to the use of a sol binder for a thick structured catalyst washcoat, a binder addition of a sinterable particulate solid may be employed. A useful sinterable solid for a gamma alumina washcoat is a boehmite (hydrated alumina) powder of fine particle size.

To prepare a washcoating slurry in this binder system, a powder blend consisting of about 80 parts by weight of a high-surface-area gamma alumina powder (surface area of about 200 $m^2/g$) and 20 parts by weight of a commercially available boehmite powder (Pural SB alumina from Sasol North America, Inc., Tuscon, Ariz., USA) is first prepared. This powder blend is then mixed into an alcohol-water vehicle consisting of 25 parts water and 75 parts ethanol by volume, with thorough blending of the mixture to obtain a homogeneous dispersion.

The slurry thus provided is applied to the interior channel walls of a cordierite honeycomb of the same honeycomb geometry as that of the honeycomb employed in Example 1. A dip coating procedure as described in Example 1 is followed to apply the individual washcoating layers, with the honeycomb being drained and the slurry coating bonded to the honeycomb channel walls by drying and firing to 550° C. after each immersion of the honeycomb in the slurry. Repeating this dip-coating procedure 3 times produces a final washcoat having a thickness of about 0.33 mm at interior corner locations within the honeycomb channels.

EXAMPLE 6

Thick Silica-Alumina Washcoat

To provide a thick porous washcoat of somewhat higher acidity than gamma alumina, a powdered alumina-silica oxide mixture may be used to provide the particulate oxide component of the washcoating slurry. A suitable coating procedure would utilize the washcoating formulation of Example 1, but wherein a mixed alumina silica powder is substituted for the gamma alumina powder used in that Example.

A suitable powder mixture for this application is a mixed alumina silica powder consisting of about 70 parts by weight of powdered alumina and 30 parts by weight of powdered silica providing a surface area of about 470 $m^2/g$. Powdered silica commercially available as Siral 30 silica powder from Sasol North America Inc. can be used to prepare this mixture.

When combined with the sol binder system of Example 1 a silica-alumina slurry exhibiting good coating characteristics for the application of a mixed oxide washcoat to a cordierite honeycomb catalyst support such as coated in Example 1 is provided. Repeated dipping, drying, and heat-curing of coating layers provided with this slurry can readily provide adherent, crack-free silica-alumina washcoats of millimeter thickness.

EXAMPLE 7

Structured Metal Catalyst Support with Thick Sol-Bound Washcoat

Thick washcoats provided in accordance with the invention can also be used to provide structured catalysts from metal packing structures of the kind utilized to enhance mass transfer in large chemical distillation and absorption columns. Examples of structured metal packing elements useful for the support of such washcoats include the Rombopak® family of structured packing elements commercially available from Kühni AG, Winterthur, Germany.

To provide a catalyst support using such a support structure a sol-bound gamma alumina washcoating slurry is prepared as described in Example 1, and a structured metal packing element of the kind above described is washcoated by repeated dipping, drying and heat-curing of slurry coating layers as described in that Example. The product of seven dipping and curing steps in accordance with this procedure is a structured metal catalyst support having a washcoating of gamma alumina about 0.6 mm in thickness that is both free of cracking defects and strongly adhered to the packing element.

Developing washcoats of very large pore size and/or pore volume can be critical for certain types of catalytic applications, particularly where three-phase processing involving the treatment of gas-liquid feed streams with solid supported catalysts is required. Advantageously, pore size and/or pore volume enhancements can readily be provided in accordance with the invention through the use of pore-forming additives to the above-described washcoating formulations. The nature of the pore-forming additive is not critical; the selected additive may comprise any one of a number of chemical agents of known utility for the enhancement of porosity in fired ceramic materials, or a combination thereof.

Specific examples of pore forming additives that are preferred for washcoat modifications in accordance with the invention include additives such as graphite and cornstarch. These can be introduced into the washcoating slurry just prior to application, with thorough mixing to insure adequate dispersion, and remain in the dried coating until the coating temperature rises to the oxidation point of the additive in the course of curing the washcoat. In cases where the structured catalytic support is itself formed of porous materials, these washcoats are less inhibiting of channel cross-flow than conventional non-porous washcoats, even though of much higher thickness.

The foregoing examples of specific compositions, processes, articles and/or apparatus employed in the practice of the present invention are of course intended to be illustrative rather than limiting, and it will be apparent that numerous variations and modifications these specific embodiments may be practices within the scope of the appended claims.

We claim:

1. In a process for catalytically treating a gas-liquid feedstream comprising a gas and a flowing liquid with a structured catalyst where the structured catalyst comprises an inorganic catalyst support structure provided with an oxide catalyst support coating containing a catalyst, the improvement wherein the flowing liquid is catalytically treated with a porous, adherent oxide catalyst support coating having an open interconnected porosity characterized by a mean pore size in the range from $0.2-10^4$ nanometers, a pore volume constituting at least 5% by volume of the coating, and one or more coating sections exceeding 300 $\mu$m in thickness.

2. A process in accordance with claim 1 wherein the oxide coating has an average thickness of at least 500 $\mu$m and a pore volume constituting at least 30% by volume of the coating.

3. A process for catalytically treating a gas-liquid feedstream with a structured catalyst where the structured catalyst comprises an inorganic catalyst support structure provided with an oxide catalyst support coating containing a catalyst, the improvement wherein
    the oxide catalyst support coating is a porous, adherent oxide coating having an open interconnected porosity characterized by a mean pore size in the range from $0.2-10^4$ nanometers, a pore volume constituting at least 5% by volume of the coating, and one or more coating sections exceeding 300 $\mu$m in thickness, and wherein
    the gas-liquid feed stream comprises hydrogen and the catalytic treating process is a hydrotreating process.

4. A process in accordance with claim 1 wherein the oxide catalyst support coating incorporates two or more regions of differing density, pore morphology, catalyst concentration, or catalyst composition.

5. A process in accordance with claim 1 wherein a reactant-permeable porous protective washcoat layer is applied over the oxide catalyst support coating to diminish catalyst erosion in use.

6. A process in accordance with claim 1 which is a hydrotreating process selected from the group consisting of hydrogenation, hydrodemetallization, and hydrodesulfurization that is carried out with a gas-liquid feed stream wherein hydrogen is present in the gas phase.

7. A process in accordance with claim 1 wherein the inorganic catalyst support structure is an inorganic honeycomb structure comprising a plurality of parallel through-channels through which the gas-liquid feedstream may flow.

8. A process in accordance with claim 7 wherein the inorganic catalyst support structure has a composition selected from the group consisting of carbide, nitride, boride and oxide ceramic compositions.

9. A process in accordance with claim 1 wherein the inorganic catalyst support structure has multiple layers and wherein catalytic species in at least some of the layers differ in composition or concentration from catalytic species in adjacent layers.

* * * * *